US007949107B2

(12) United States Patent
Boss et al.

(10) Patent No.: US 7,949,107 B2
(45) Date of Patent: May 24, 2011

(54) METHOD, SYSTEM, AND COMPUTER PROGRAM PRODUCT FOR PROVIDING PRIVACY MEASURES IN INSTANT MESSAGING SYSTEMS

(75) Inventors: Gregory J. Boss, American Fork, UT (US); Rick A. Hamilton, II, Charlottesville, VA (US); Andrew R. Jones, Round Rock, TX (US); Kevin C. McConnell, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 867 days.

(21) Appl. No.: 11/210,614

(22) Filed: Aug. 24, 2005

(65) Prior Publication Data

US 2007/0064899 A1    Mar. 22, 2007

(51) Int. Cl.
*H04M 1/64* (2006.01)
(52) U.S. Cl. .................. 379/88.22; 715/230
(58) Field of Classification Search .......... 379/88.22, 379/88.23, 88.11; 715/526, 230
See application file for complete search history.

(56) References Cited

U.S. PATENT DOCUMENTS

| | | | | |
|---|---|---|---|---|
| 5,999,175 | A * | 12/1999 | Nalder | 715/766 |
| 7,092,707 | B2 * | 8/2006 | Lau et al. | 455/423 |
| 7,546,334 | B2 * | 6/2009 | Redlich et al. | 709/201 |
| 2003/0229673 | A1 * | 12/2003 | Malik | 709/207 |
| 2004/0010808 | A1 * | 1/2004 | deCarmo | 725/139 |
| 2004/0023670 | A1 | 2/2004 | Merheb | |
| 2004/0068649 | A1 | 4/2004 | Haller et al. | |
| 2004/0143632 | A1 * | 7/2004 | McCarty | 709/206 |
| 2005/0235035 | A1 * | 10/2005 | Benejam et al. | 709/206 |
| 2006/0036740 | A1 * | 2/2006 | Hagale et al. | 709/227 |
| 2006/0161842 | A1 * | 7/2006 | Chen et al. | 715/526 |

FOREIGN PATENT DOCUMENTS

WO    WO 2005020609 A2    2/2005

OTHER PUBLICATIONS

Inspec, Danyu et al., "Sharing Presence Information and Message Notification in an Ad Hoc Network", AN 7816189, Proceedings of the First IEEE International Conference on Pervasive Computing and Communications, pp. 351-358, Mar. 23-26, 2003.
Inspec, Kikuchi et al., "Secure Instant Messaging Protocol Preserving Confidentiality Against Administrator", AN 8212070, 18$^{th}$ International Conference on Advanced Information Networking and Applications, vol. 2, pp. 27-30, 2004.
Stone et al., "Instant Messaging or Instant Headache?", pp. 74-80, Apr. 2004.
Borisov et al., "Off-the-Record Communication, or, Why Not to Use PGP", pp. 77-84, 2004.
Lederer et al., "Personal Privacy Through Understanding and Action: Five Pitfalls for Designers", pp. 440-454, 2004.

* cited by examiner

*Primary Examiner* — Curtis Kuntz
*Assistant Examiner* — Amal Zenati
(74) *Attorney, Agent, or Firm* — William Schiesser; Hoffman Warnick LLC

(57) ABSTRACT

The present invention provides privacy measures in instant messaging systems. A method in accordance with an embodiment of the present invention includes: setting a time-out value for a message; sending the message to a receiving user; and displaying the message to the receiving user only for a time period equal to the time-out value. In another embodiment, a stealth delivery mode is provided in which an IM message is displayed to the receiving user only if the receiving user has approved the display of the IM message. In a further embodiment, a predetermined number of elements received prior to a current IM message are displayed in the conversation pane of an IM client, based on a threshold value.

15 Claims, 8 Drawing Sheets

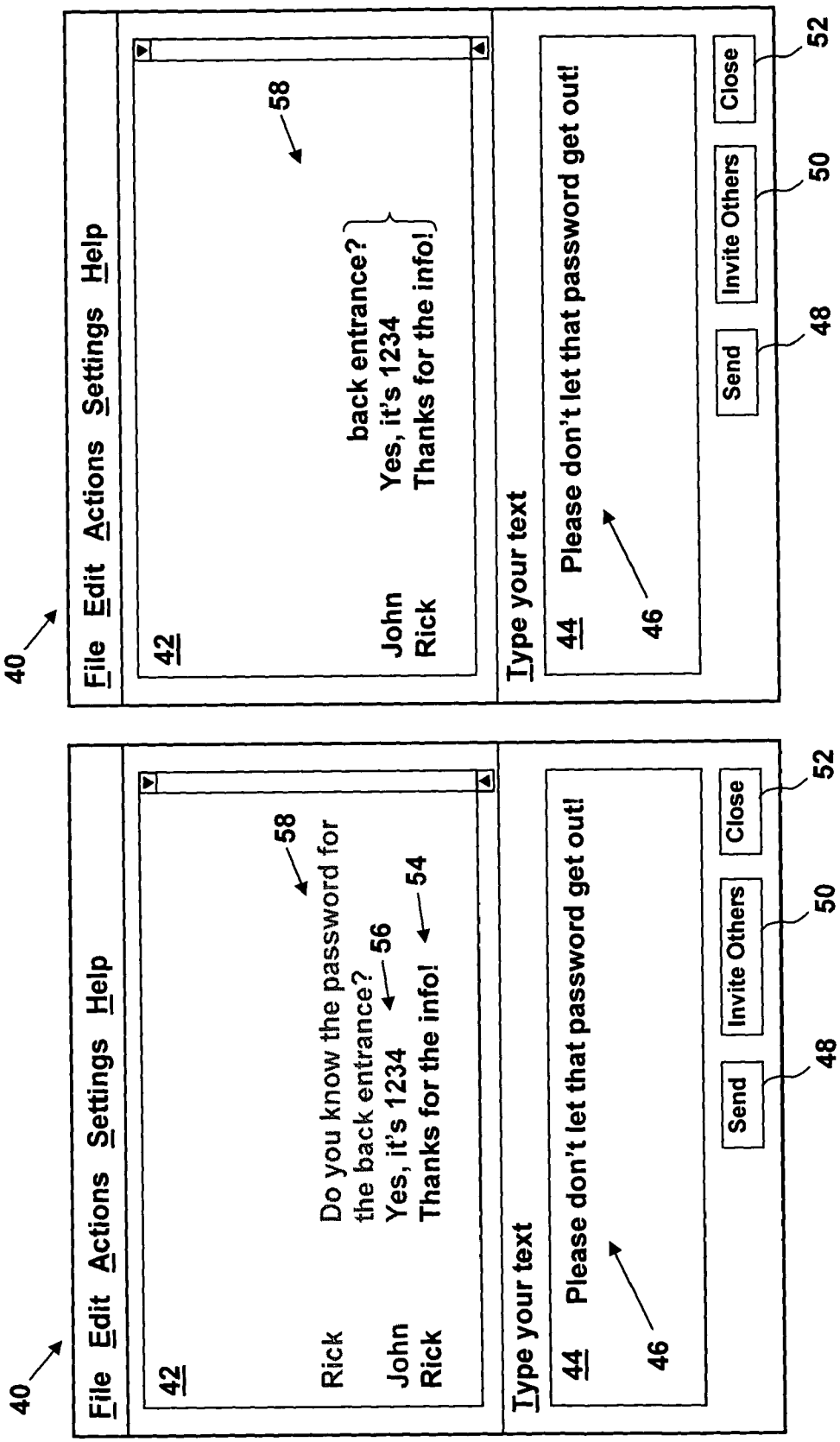

METHOD, SYSTEM, AND COMPUTER PROGRAM PRODUCT FOR PROVIDING PRIVACY MEASURES IN INSTANT MESSAGING SYSTEMS

FIELD OF THE INVENTION

The present invention generally relates to instant messaging systems, and more specifically relates to a method, system, and computer program product for providing privacy measures in instant messaging systems.

BACKGROUND OF THE INVENTION

Instant messaging (IM) systems are used to send messages between users over a network (e.g., the Internet or an intranet) in real-time. Once delivered, the messages typically remain on a receiving user's system until processed by the receiving user. Such static persistence of received messages is not always desirable for reasons of security. In addition, although most IM clients automatically display messages for viewing, there may be times when a receiving user would like to make sure that no one else can view the messages. Again, this feature of IM systems raises security concerns.

Currently, IM users can only handle sensitive messages indirectly. That is, they must manually anticipate their environment and change the properties of their IM client to accommodate their current environment. For example, a user might find himself in a meeting sitting next to several co-workers, clients, or even competitors. In this type of situation, the user may wish to have a private IM conversation to which those around him are not privy. To protect that privacy, the user can move his laptop or computing device to a position where it cannot be seen by those close to him. This is often disruptive to a meeting and may promote an attitude of distrust between co-workers, clients, and associates. It is also not reliable. Another option is to simply turn off IM availability so that a user cannot receive any messages. This is less then ideal since IM messages can be of a mission critical nature or offer a competitive edge to the user. Another possible solution is to configure the IM client such that it does not bring new IM windows to the foreground, and then purposefully place another application window in the foreground so that the content of the IM window cannot be seen. This process can be cumbersome, especially during long IM sessions, because the user must constantly alternate between windows when reading/composing and hiding IM messages. Another known solution consists of constantly closing the IM window so that the previous content of that window is no longer visible on the display. This does not prevent those within viewing distance from reading the content in real-time, but it does help to a degree. One disadvantage with this technique is that the user cannot see a history of the conversation or easily store that conversation in its entirety.

SUMMARY OF THE INVENTION

In general, the present invention provides a method, system, and computer program product for providing privacy measures in instant messaging systems. A time-out value (ToV) specified by a user sending an IM message is used to control how long a message will remain on a receiving user's display (and optionally the sending user's display). A "trailing shadow" display filter for privacy enhancement is also provided.

The trailing shadow display filter is configured to display at most x number of elements (e.g., characters, words, lines, messages, etc.) of a user's chat history on the user's display.

A first aspect of the present invention is directed to a method for providing message privacy, comprising: setting a time-out value for a message; sending the message to a receiving user; and displaying the message to the receiving user only for a time period equal to the time-out value.

A second aspect of the present invention is directed to a system for providing message privacy, comprising: a system for setting a time-out value for a message; a system for sending the message to a receiving user; and a system for displaying the message to the receiving user only for a time period equal to the time-out value.

A third aspect of the present invention is directed to a program product stored on a computer readable medium for providing message privacy, the computer readable medium comprising program code for performing the following steps: setting a time-out value for a message; sending the message to a receiving user; and displaying the message to the receiving user only for a time period equal to the time-out value.

A fourth aspect of the present invention is directed to a method for deploying an application for providing message privacy, comprising: providing a computer infrastructure being operable to: set a time-out value for a message; send the message to a receiving user; and display the message to the receiving user only for a time period equal to the time-out value.

A fifth aspect of the present invention is directed to computer software embodied in a propagated signal for providing message privacy, the computer software comprising instructions to cause a computer system to perform the following functions: set a time-out value for a message; send the message to a receiving user; and display the message to the receiving user only for a time period equal to the time-out value.

A sixth aspect of the present invention is directed to a method for providing message privacy, comprising: selecting, by a sending user, a stealth delivery option for an instant message (IM) message; sending the IM message to a receiving user; upon receipt of the IM message, preventing display of the IM message and requesting the receiving user to approve the display of the IM message; and displaying the IM message to the receiver only if the receiver has approved the display of the IM message.

A seventh aspect of the present invention is directed to a method for providing message privacy, comprising: setting a threshold value; receiving a current instant messaging (IM) message; displaying the current IM message in a conversation pane; and displaying in the conversation pane a predetermined number of elements received prior to the current IM message, based on the threshold value.

BRIEF DESCRIPTION OF THE DRAWINGS

These and other features of this invention will be more readily understood from the following detailed description of the various aspects of the invention taken in conjunction with the accompanying drawings in which:

FIGS. 5-9 depict the operation of a trailing shadow display filter in accordance with embodiments of the present invention.

Figure 1:
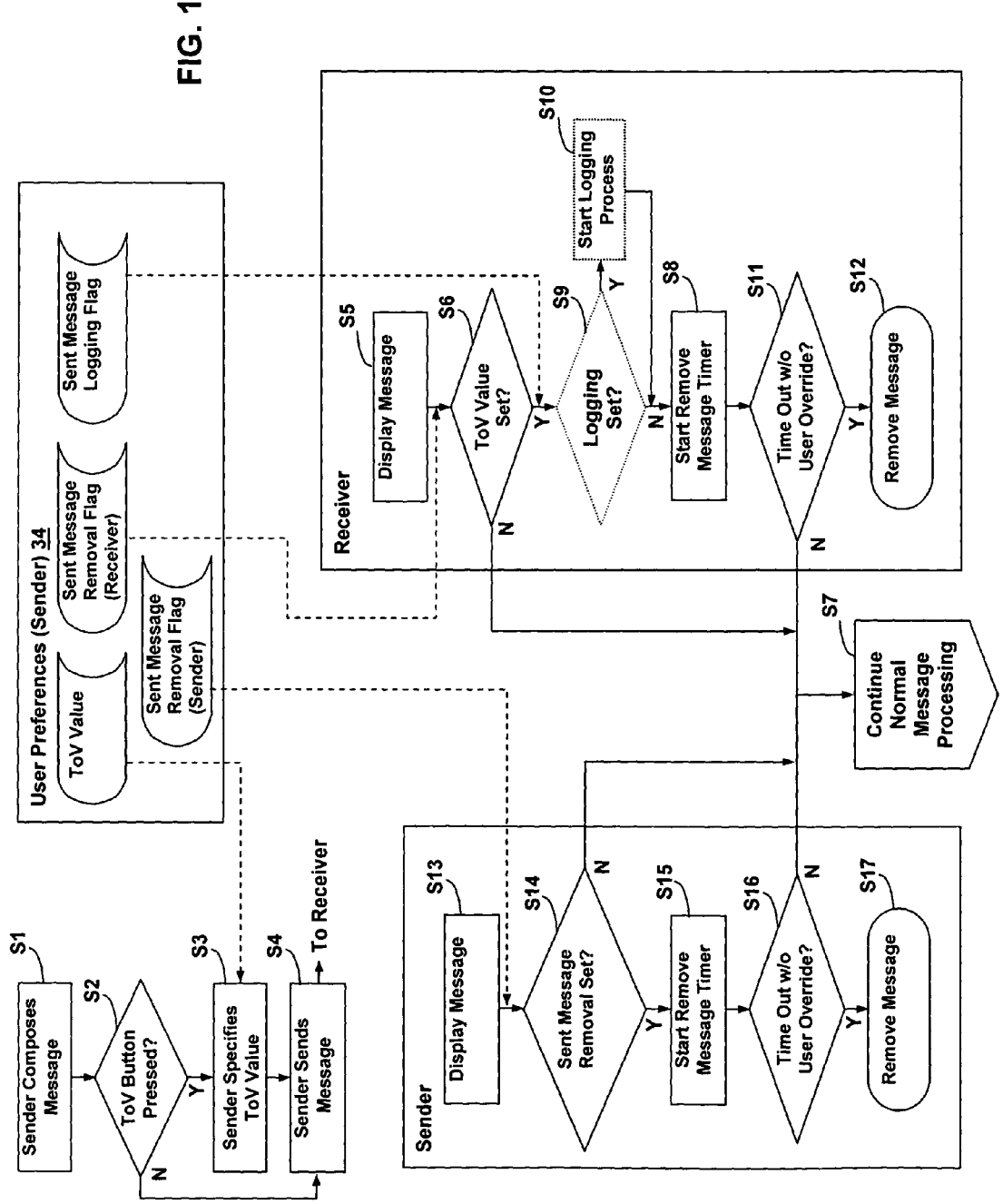
FIG. 1 depicts a flow diagram of a time-out value method in accordance with an embodiment of the present invention.

The drawings are merely schematic representations, not intended to portray specific parameters of the invention. The drawings are intended to depict only typical embodiments of the invention, and therefore should not be considered as limiting the scope of the invention. In the drawings, like numbering represents like elements.

BEST MODE FOR CARRYING OUT THE INVENTION

The present invention provides a method, system, and computer program product for providing privacy measures in instant messaging (IM) systems. Although described herein primarily for use with IM systems, it will be apparent to those skilled in the art that many of the features of the present invention can also be used to provide privacy measures in other types of messaging systems including, for example, electronic mail (email) systems.

In a first embodiment of the present invention, a time-out value (ToV) specified by a user sending an IM message is used to control how long a message will remain on a receiving user's display (and optionally the sending user's display). A flow diagram 10 illustrating this process is illustrated in FIG. 1.

Figure 2:
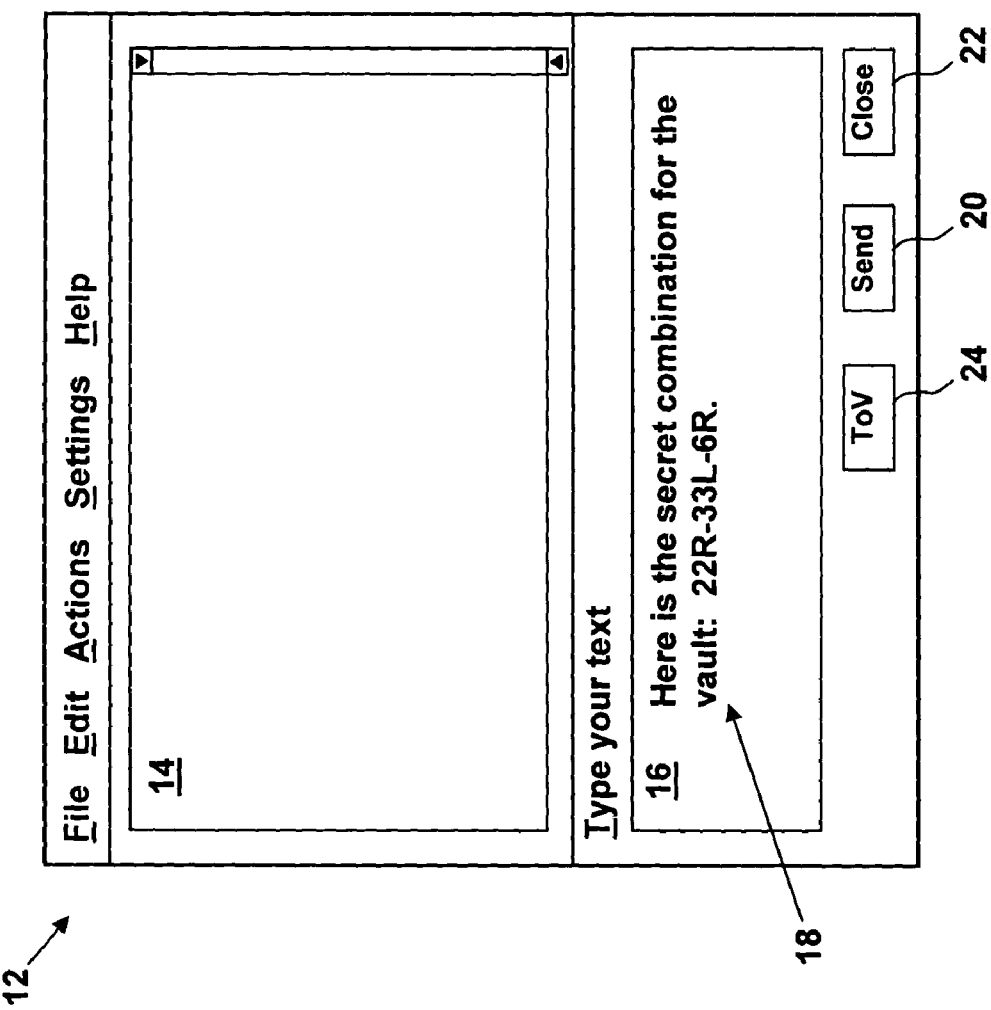
FIG. 2 depicts an illustrative dialog window of an IM client for composing, sending, and reading IM messages in accordance with an embodiment of the present invention.

In step S1, a sending user ("sender") composes an IM message that will be sent to at least one receiving user ("receiver"). An illustrative dialog window 12 of an IM client for composing, sending, and receiving IM messages in accordance with an embodiment of the present invention is depicted in FIG. 2. The dialog window 12 generally includes a conversation pane 14 for displaying the current IM conversation ("chat"), a message pane 16 for displaying an IM message 18 to be sent, a Send button 20 for sending the IM message in the message pane 16 to the receiver, and a Close button 22 for closing the dialog window 12. In addition, the dialog window 12 includes a ToV button 24 for setting a time-out value for the IM message in the message pane 16.

Figure 3:
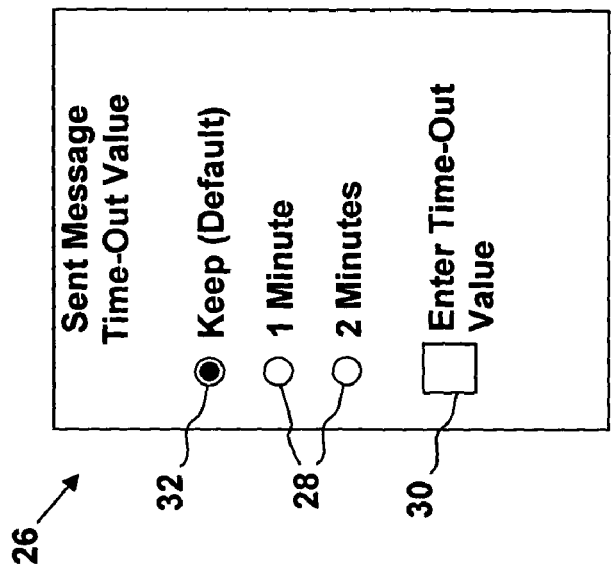
FIG. 3 depicts an illustrative time-out value (ToV) pop-up window in accordance with an embodiment of the present invention.

In step S2, a ToV pop-up window (or other suitable interface) appears if the sender presses the ToV button 24 in the dialog window 12. An illustrative ToV popup window 26 is depicted in FIG. 3. As shown, the ToV pop-up window 26 allows the sender to select (step S3) the length of the time-out value associated with an IM message to be sent. The sender can select a preset time-out value using the radio buttons 28 (or other suitable mechanism) or can enter a desired time-out value in a field 30. Other mechanisms such as a dropdown selection box, combination box, etc., can be used to select/enter a desired time-out value. The sender can also choose to allow the receiver to keep the sent IM message by selecting the "keep" radio button 32. In this example, the "keep" radio button 32 is set as the default value (e.g., via user preferences 34, FIG. 1), although this need not be the case. The sender can also optionally select (e.g., via user preferences 34) how long the sent IM message will remain in the conversation pane 14 of the sender's dialog window 12. Next, in step S4, the sender sends the IM message, the time-out value (if any), and a flag indicating the time-out value status (e.g., set/not set) to the receiver by pressing the Send button 20.

Upon receipt of the IM message, the IM message is displayed (step S5) in a conventional manner in the conversation pane 14 of the receiver's IM client. Next, in step S6, the receiver's IM client determines whether the received IM message has an associated time-out value by examining the time-out value status flag. If the flag indicates that the received IM message does not include a time-out value, then the received IM message is processed normally in step S7. If the flag indicates that the received IM message does include a time-out value, the receiver's IM client starts, in step S8, a "remove message" timer that is set to the time-out value included with the received IM message.

The receiver's IM client can be configured, if desired, to log and store all received messages, including those having a time-out value. This process is illustrated in phantom in FIG. 1 as steps S9 and S10. The logging of received messages can be allowed/prevented by the sender. For example, the sender's IM client can include a flag (e.g., set via user preferences 34) that allows/prevents the logging by the receiver's IM client of received messages having a time-out value.

If it is determined in step S11 that a time-out has occurred (e.g., the remove message timer has counted down to zero in step S8), and the receiver has not overridden the time-out value, then the received message displayed in the conversation pane 14 of the dialog window 12 in the receiver's IM client is removed in step S12. If the receiver has overridden the time-out value, then the received IM message is processed normally in step S7. The receiver can override the time-out value, if desired, in a number of different ways. For example, a pop-up window can be displayed when the remove message timer has counted down to zero in step S8 asking the receiver to confirm the removal of the IM message. Other techniques are also possible.

As described above, the sender can also optionally select how long the sent IM message will remain in the conversation pane 14 of the sender's dialog window 12. In step S13 of FIG. 1, the IM message sent to the receiver is displayed in the conversation pane 14 of the dialog window 12 of the sender's IM client. If it is determined in step S14 that the sender has set a flag indicating that the sent IM message is to be removed after a preset time, then the sender's IM client starts, in step S15, a "remove message timer" that is set to a desired time-out value. The time-out value can be the same as, or different from, the time-out value specified in step S3. If it is determined in step S16 that a time-out has occurred (e.g., the remove message timer has counted down to zero in step S15), and the sender has not overridden the time-out value, then the sent message displayed in the sender's IM client is removed in step S17. If the sender has overridden the time-out value, or if the sent IM message does not include a time-out value, then the sent IM message is processed normally in step S7.

In another embodiment of the present invention, logging by the receiver's IM client can be prevented by graphically representing data in the IM message as bitmaps rather than interpretable ASCII characters and by placing the bitmaps with watermarked backgrounds that prevent optical character recognition. This technique in combination with the above-described ToV technique can be used to make IM message data both temporary and non-recordable or private.

The above-described techniques can also be used in conjunction with messaging systems such as email. For example, messages can be removed from a receiver's inbox and/or sender's outbox after an associated time-out value has expired.

In accordance with another embodiment of the present invention, a "trailing shadow" display filter for privacy enhancement is provided. In particular, the trailing shadow display filter is configured to display at most x number of elements (e.g., characters, words, lines, messages, etc.) of a user's chat history on the user's display. The trailing shadow display filter of the present invention is described in greater detail below with reference to FIGS. 4-9.

Figure 4:
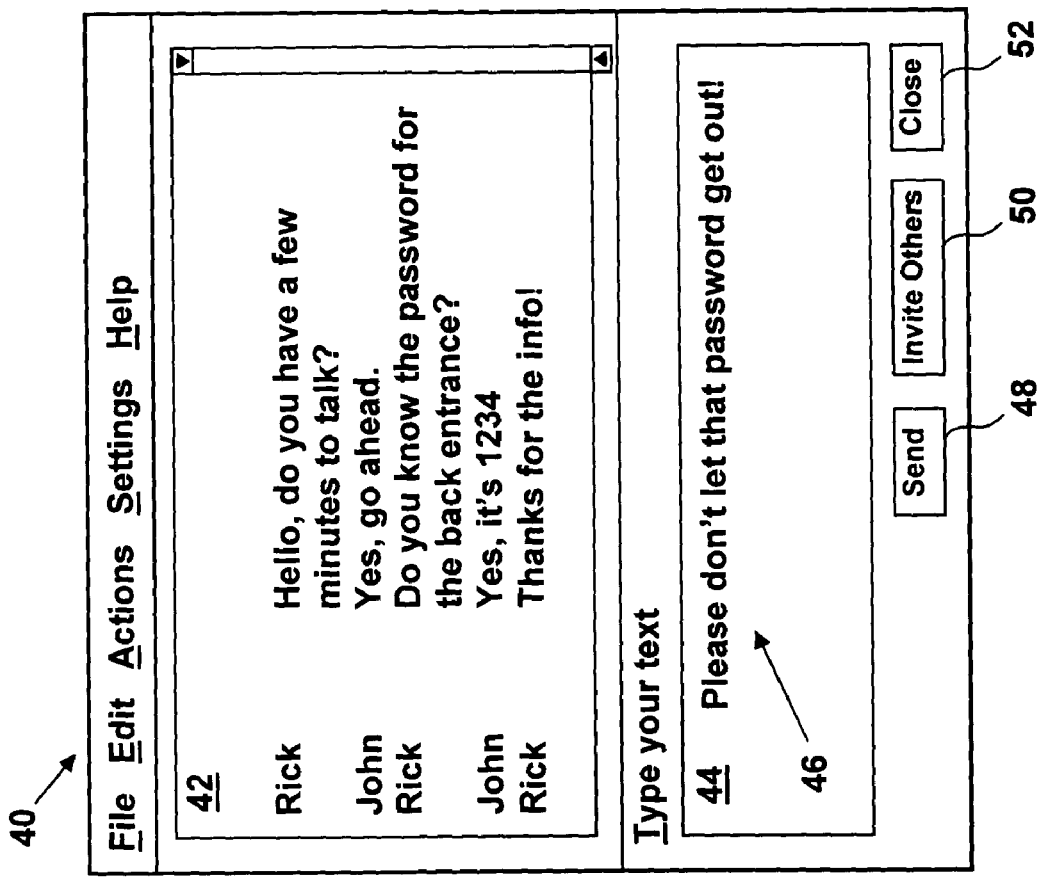
FIG. 4 depicts an illustrative dialog window of an IM client for composing, sending, and receiving IM messages in accordance with another embodiment of the present invention.

Another illustrative dialog window 40 of an IM client for composing, sending, and receiving IM messages is depicted in FIG. 4. The dialog window 40 generally includes a conversation pane 42 for displaying a current IM conversation ("chat"), a message pane 44 for displaying an IM message 46 to be sent, a Send button 48 for sending the IM message in the message pane 44 to the IM users involved in the current chat, an Invite Others button 50 for inviting other IM users into the chat, and a Close button 52 for closing the dialog window 40.

A user can choose a threshold level of privacy (e.g., last two IM messages, last two lines, last fifty words, last one hundred characters, etc.) to be provided by the trailing shadow display filter of the present invention. This information can be entered by a user, for example, using a graphical user interface (GUI) preferences dialog or other suitable mechanism. In accordance with this embodiment of the present invention, trailing IM messages are defined as IM messages previously sent and received in a current chat session and which show up in the conversation pane 42 of the dialog window 40 of a user's IM client as a history of the chat session.

The trailing shadow display filter causes a subset of the trailing IM messages (or a subset of the characters, words, lines, etc., of the trailing IM messages) in the conversation pane 42 to disappear (partially or completely) as the privacy threshold described above is met. For example, if a user sets a privacy threshold of two IM messages, only the most recent trailing IM message will remain visible on the display, and all other earlier trailing IM messages will disappear (completely or partially) from the display.

Figure 5:
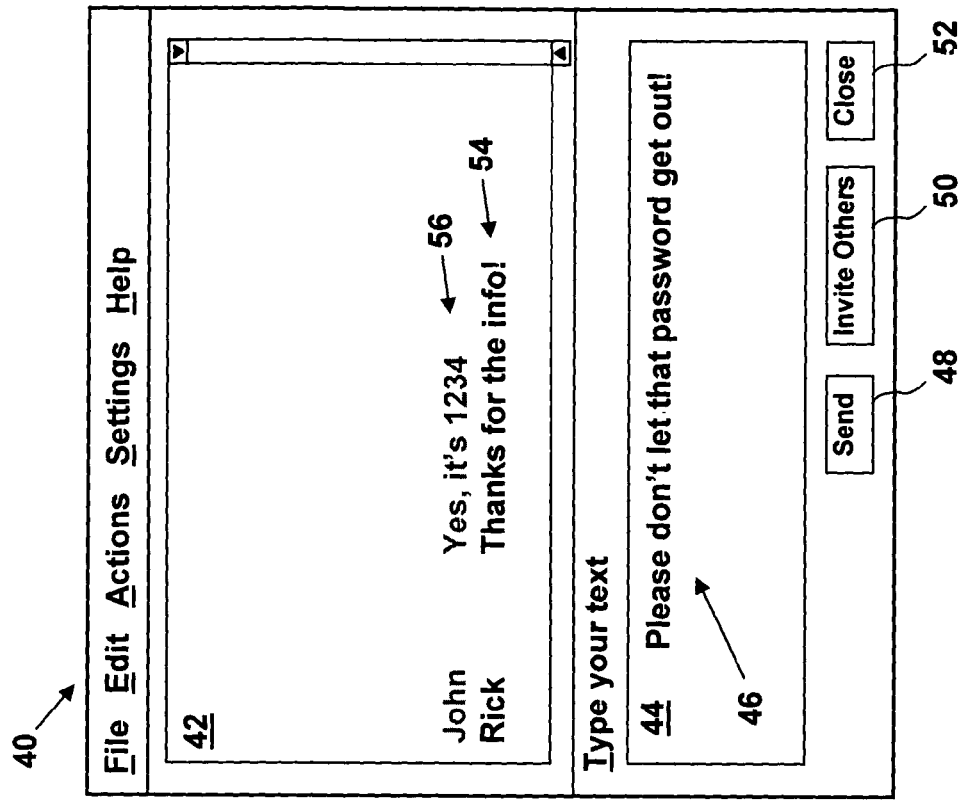
Figure 6:
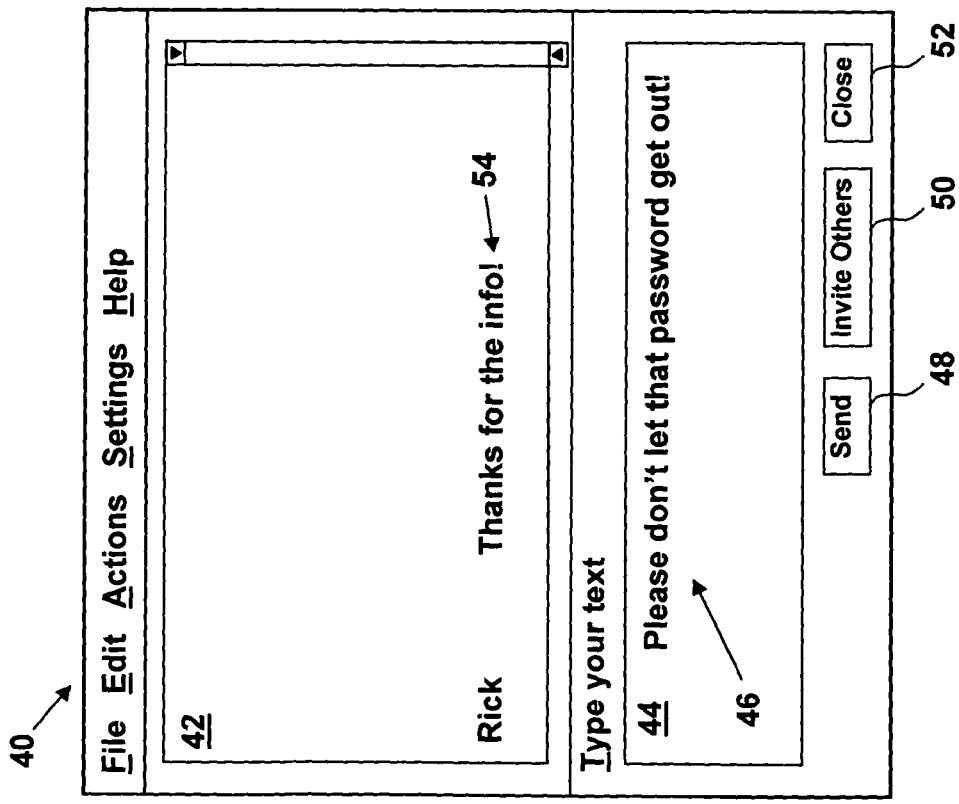

An example in which only a most recent trailing IM message 54 is displayed and all earlier trailing IM messages have completely disappeared (i.e., a privacy threshold of two IM messages) is illustrated in FIG. 5. An example in which the most recent trailing IM message 54 is displayed, the second-most recent trailing IM message 56 has partially disappeared, and all other earlier trailing IM messages have completely disappeared (i.e., a privacy threshold of two messages with shadowing) is illustrated in FIG. 6. In this example, the second-most recent trailing IM message 56 is displayed such that it is noticeable lighter than the most recent trailing IM message 54; it appears as if it is a "shadow" of the original IM message that is fading away from sight. As shown in FIG. 7, progressive shadowing can also be used over a plurality of the trailing IM messages, such that earlier trailing IM messages appear lighter than later trailing IM messages (i.e., the third-most recent trailing IM message 58 is lighter than the second-most recent trailing IM message 56, which is lighter than the most-recent trailing IM message 54). In this example, the privacy threshold is again two messages. The amount/type of shadowing can be set by a user via a preferences dialog or the like.

The examples illustrated in FIGS. 5-7 can also be used to represent the case in which the threshold level of privacy comprises a predetermined number of lines. In FIG. 5, for example, only the most recent line of the trailing IM messages is displayed (i.e., a privacy threshold of two lines). In FIG. 6, a predetermined number of lines (one) of the trailing IM messages that occur earlier than the most recent line are displayed using shadowing (i.e., a privacy threshold of two lines with shadowing). In FIG. 7, a predetermined number of lines (three) of the trailing IM messages that occur earlier than the most recent line are displayed using progressive shadowing (i.e., a privacy threshold of two lines with progressive shadowing).

Figure 9:
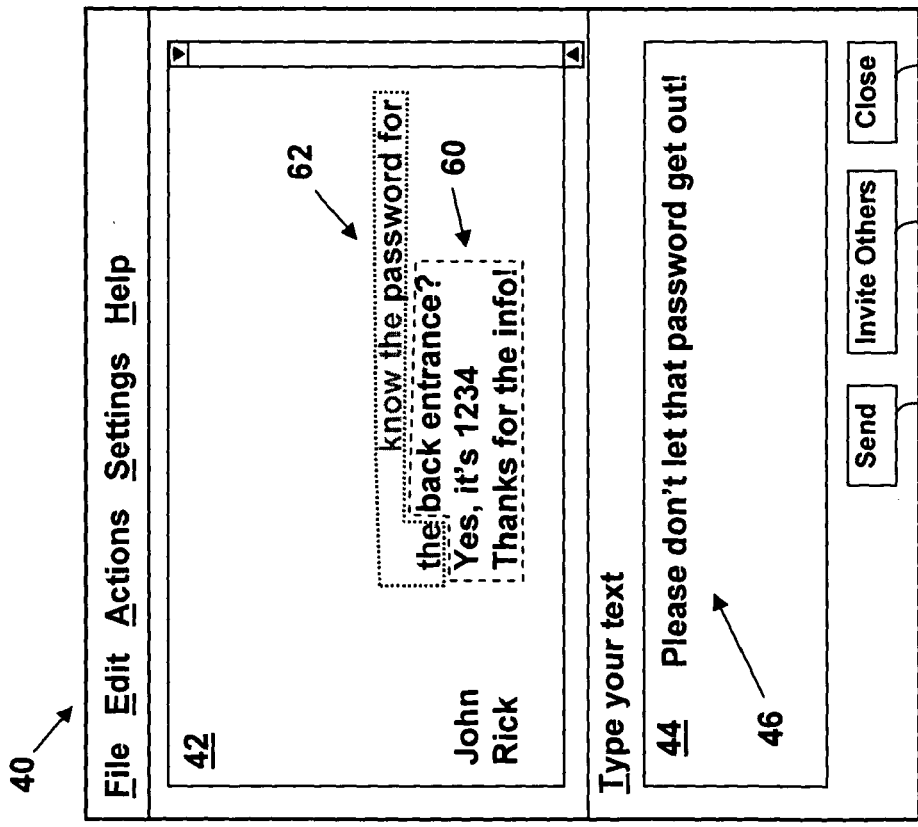

An example in which the threshold level of privacy comprises a predetermined number of characters is illustrated in FIGS. 8 and 9. In FIG. 8, for example, only the most recent set of fifty characters 60 in the trailing IM messages are displayed (i.e., a privacy threshold of fifty-one characters). In FIG. 9, however, a predetermined number (twenty-one) of characters 62 in the trailing IM messages that occur earlier than the most recent set of fifty characters 60 are displayed using shadowing (progressive shadowing in this case).

The example illustrated in FIG. 8 can also be used to represent the case in which the threshold level of privacy comprises a predetermined number of words (ten), and where only the most recent set of nine words in the trailing IM messages are displayed. Similarly, the example illustrated in FIG. 9 can be used to represent the case in which a predetermined number of words (five) in the trailing IM messages that occur earlier than the most recent set of nine words are displayed using shadowing (progressive shadowing in this case).

Use of the trailing shadow display filter of the present invention helps to prevent prying eyes from seeing previous messages and discerning the context of the current content on the display. The trailing shadow display filter could be implemented, for example, such that the text that has "disappeared" from view is actually permanently removed from the display and from any local caches. Another embodiment would include changing the foreground text color to match the background color of the IM window, effectively making the text disappear but still leaving the text intact. This would allow the user to go back and select (e.g., using a mouse or keyboard) and view the hidden text, since a selection operation typically highlights text in opposite colors in most operating systems.

In accordance with another embodiment of the present invention, a "stealth" delivery of IM messages is used to enhance privacy. Normally, an IM message is automatically displayed in an IM client upon receipt. With stealth delivery, however, an IM message is not automatically displayed. Rather, a notification is first provided to the receiver (e.g., via a stealth pop-up window) that an IM message is waiting and available for display. To this extent, the receiver of the IM message must explicitly request/approve (e.g., via a button in the stealth pop-up window) the display of the waiting IM message before the IM message can be displayed in the receiver's IM client.

Figure 10:
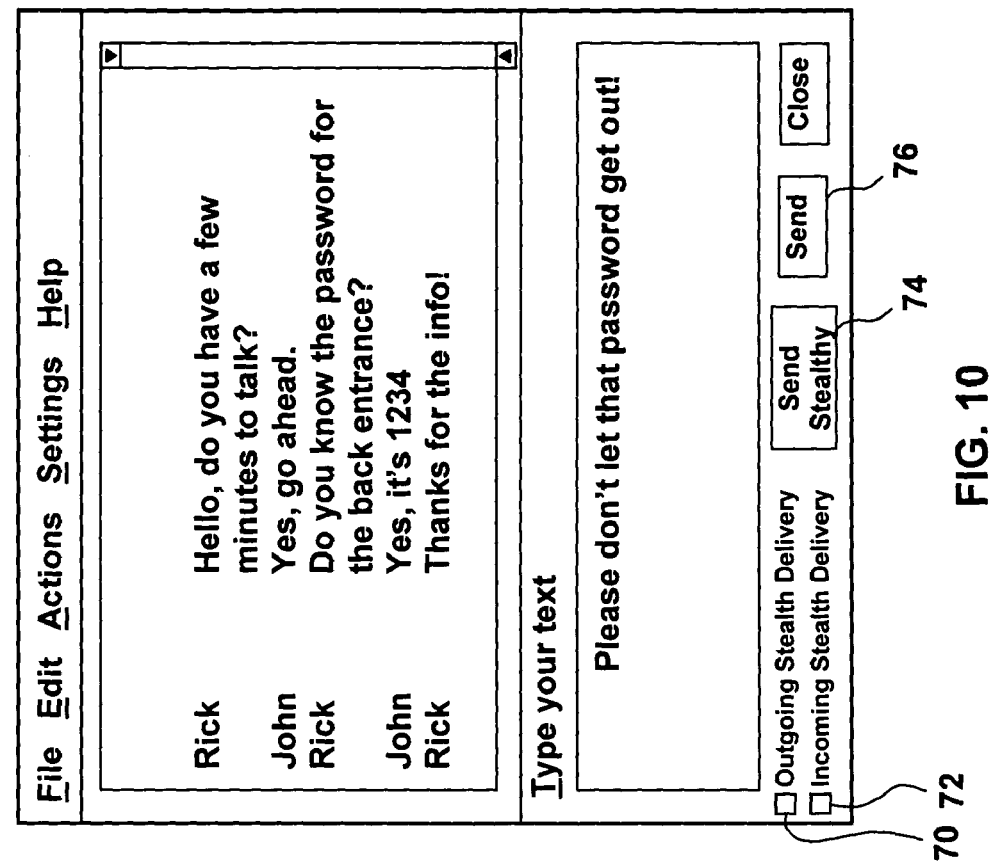
FIG. 10 depicts an illustrative dialog window of an IM client for stealth delivery of IM messages in accordance with another embodiment of the present invention.

The sender and/or receiver of an IM message can specify the use of stealth delivery. For example, as shown in FIG. 10, a user can specify via a checkbox 70 that stealth delivery of outgoing IM messages is desired. Further, the user may specify, again using a checkbox 72, that stealth delivery of incoming IM messages is desired. Other mechanisms can also be used to indicate the use of stealth delivery. For example, stealth delivery of outgoing and/or incoming IM messages can be specified in a preference dialog. As another example, as shown in FIG. 10, a Send Stealthy button 74 can be used instead of the conventional Send button 76 to send an IM message via stealth delivery.

Figure 12:
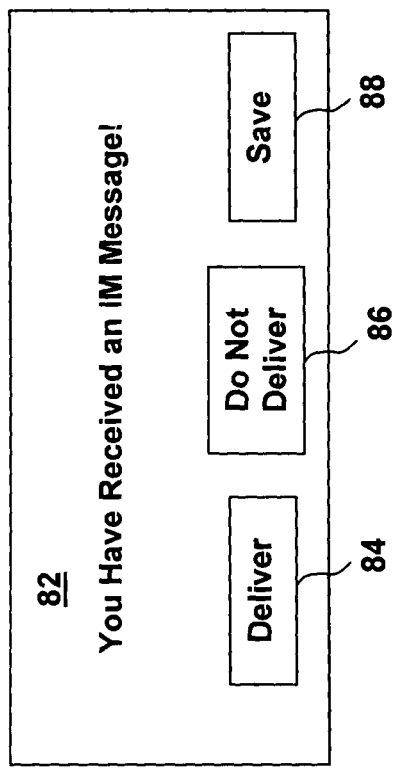
FIG. 12 depicts an illustrative pop-up window for informing a user that an IM message has been received and is available for display.
Figure 11:
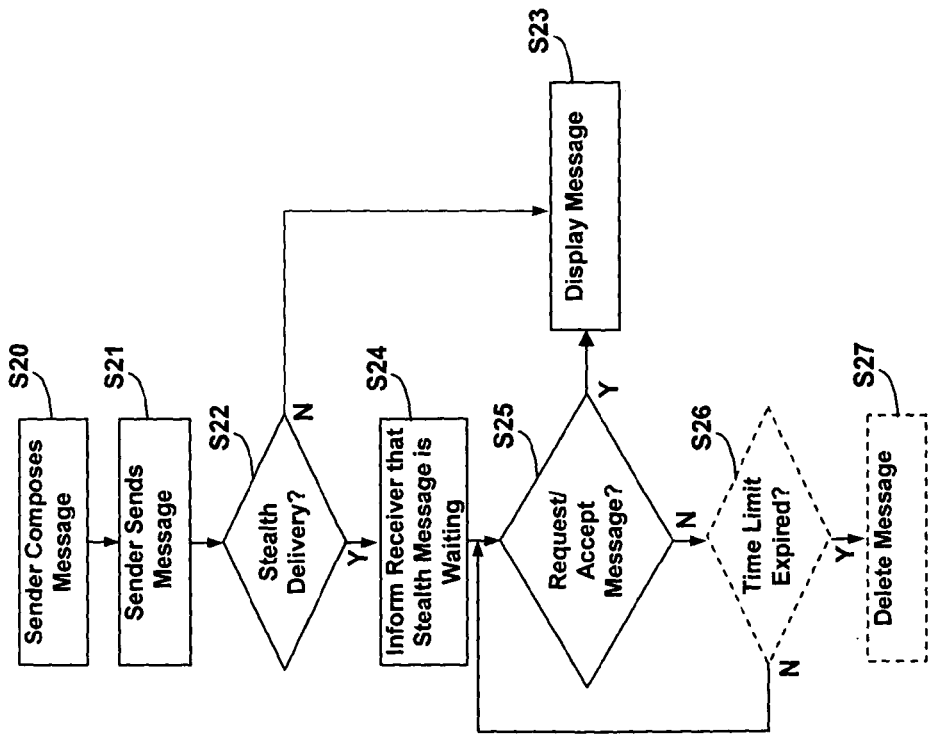
FIG. 11 depicts a flow diagram of a method for stealth delivery of IM messages in accordance with an embodiment of the present invention.

A flow diagram 80 of a method for the stealth delivery of an IM message is provided in FIG. 11. In step S20, a sender composes an IM message. In step S21, the sender sends the IM message to a receiver. In step S22, if stealth delivery is not requested, the IM message is automatically displayed in the receiver's IM client in step S23. If stealth delivery of the IM message is requested (e.g., by the sender and/or receiver), however, a message is sent to the receiver in step S24 informing the receiver that an IM message is waiting and available for display. The message can be provided in a pop-up window 82 (FIG. 12) or using any other suitable mechanism. In step S25, after receiving the message indicating that an IM message is waiting, the receiver can request/approve of the delivery of the waiting IM message. This can be done, for example, by actuating a Deliver button 84 (FIG. 12) in the pop-up window 82. If the Deliver button 84 is actuated (i.e., the receiver approves the delivery of the IM message), the IM message is displayed in step S23. If the receiver explicitly chooses not to view the message (e.g., by selecting a Do Not Deliver button 86 (FIG. 12), then the IM message is deleted. The receiver can also choose to save the message for later viewing by selecting a Save button 88.

A waiting time limit can optionally be set for the stealth delivery of an IM message, such that if a waiting IM message is not requested/approved by the receiver within a predetermined period of time (step S26) the message is deleted (step S27). A message can be sent to the sender of the message indicating that the IM message was not displayed in the receiver's IM client.

In accordance with another embodiment of the present invention, a sender of an IM message can mark the IM message as private and require the receiver of the IM message to initiate additional authentication with the receiver's IM client. This "private delivery" technique would be highly usefully, for example, when two parties are discussing highly sensitive information and the sender is requesting verification that the intended receiver is actually viewing the message. In addition, such a private delivery technique would be a very desirable feature for those individuals wishing to hide communications that may be unintentionally intercepted by other users on a shared system. A number of existing encryption technologies could be used including PKI (public key infrastructure) or private exchange keys and their associated methods.

A ToV feature can also be combined with the private delivery technique so that once authentication has occurred and messages are being exchanged, a short ToV value will help ensure that the exchange remains private in the event a person leaves the screen device displaying the sensitive data. In this scenario the authentication credentials are only maintained as long as each party's presence at the computer can be recertified. This could be done, for example, by monitoring the keystrokes while focus is maintained on the IM windows. If one or both users stops entering text for more than x seconds, then the authentication credentials are marked as expired and the text of that conversation is cleared.

Figure 13:
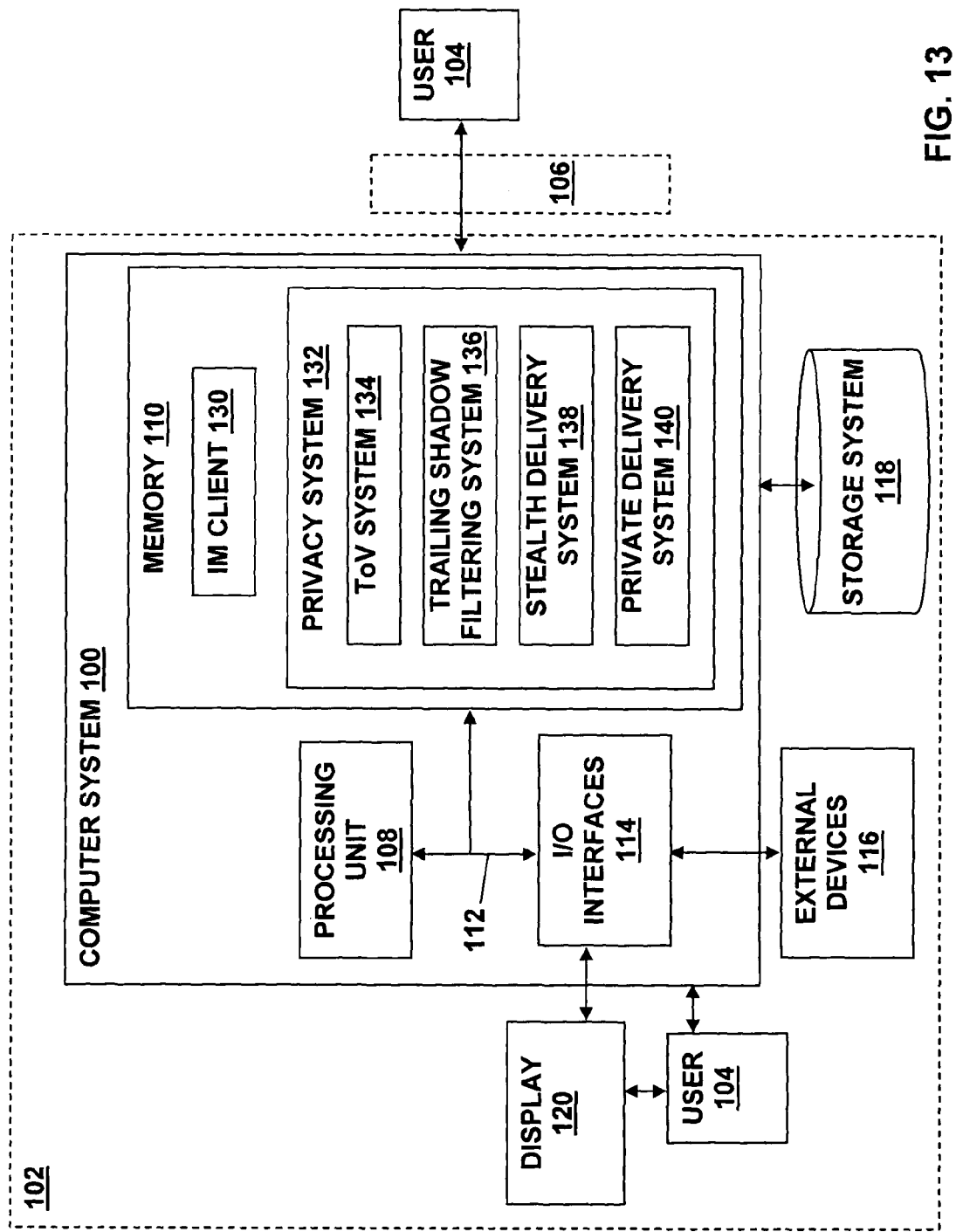
FIG. 13 depicts an illustrative computer system for implementing embodiment(s) of the present invention.

A computer system 100 for providing privacy measures in instant messaging systems in accordance with an embodiment of the present invention is depicted in FIG. 13. Computer system 100 is provided in a computer infrastructure 102. Computer system 100 is intended to represent any type of computer system capable of carrying out the teachings of the present invention. For example, computer system 100 can be a laptop computer, a desktop computer, a workstation, a handheld device, a server, a cluster of computers, etc. In addition, as will be further described below, computer system 100 can be deployed and/or operated by a service provider that offers a service for providing privacy measures in instant messaging systems in accordance with the present invention.

It should be appreciated that a user 104 can access computer system 100 directly, or can operate a computer system that communicates with computer system 100 over a network 106 (e.g., the Internet, a wide area network (WAN), a local area network (LAN), a virtual private network (VPN), etc). In the case of the latter, communications between computer system 100 and a user-operated computer system can occur via any combination of various types of communications links. For example, the communication links can comprise addressable connections that can utilize any combination of wired and/or wireless transmission methods. Where communications occur via the Internet, connectivity can be provided by conventional TCP/IP sockets-based protocol, and an Internet service provider can be used to establish connectivity to the Internet.

Computer system 100 is shown including a processing unit 108, a memory 110, a bus 112, and input/output (I/O) interfaces 114. Further, computer system 100 is shown in communication with external devices/resources 116 and one or more storage systems 118. In general, processing unit 108 executes computer program code, such as privacy system 132, that is stored in memory 110 and/or storage system(s) 118. While executing computer program code, processing unit 108 can read and/or write data, to/from memory 110, storage system(s) 118, and/or I/O interfaces 114. Bus 112 provides a communication link between each of the components in computer system 100. External devices/resources 116 can comprise any devices (e.g., keyboard, pointing device, display (e.g., display 120, printer, etc.) that enable a user to interact with computer system 100 and/or any devices (e.g., network card, modem, etc.) that enable computer system 100 to communicate with one or more other computing devices.

Computer infrastructure 102 is only illustrative of various types of computer infrastructures that can be used to implement the present invention. For example, in one embodiment, computer infrastructure 102 can comprise two or more computing devices (e.g., a server cluster) that communicate over a network (e.g., network 106) to perform the various process steps of the invention. Moreover, computer system 100 is only representative of the many types of computer systems that can be used in the practice of the present invention, each of which can include numerous combinations of hardware/software. For example, processing unit 108 can comprise a single processing unit, or can be distributed across one or more processing units in one or more locations, e.g., on a client and server. Similarly, memory 110 and/or storage system(s) 118 can comprise any combination of various types of data storage and/or transmission media that reside at one or more physical locations. Further, I/O interfaces 114 can comprise any system for exchanging information with one or more external devices/resources 116. Still further, it is understood that one or more additional components (e.g., system software, communication systems, cache memory, etc.) not shown in FIG. 13 can be included in computer system 100. However, if computer system 100 comprises a handheld device or the like, it is understood that one or more external devices/resources 116 (e.g., a display) and/or one or more storage system(s) 118 can be contained within computer system 100, and not externally as shown.

Storage system(s) 118 can be any type of system (e.g., a database) capable of providing storage for information under the present invention. To this extent, storage system(s) 118 can include one or more storage devices, such as a magnetic disk drive or an optical disk drive. In another embodiment, storage system(s) 118 can include data distributed across, for example, a local area network (LAN), wide area network (WAN) or a storage area network (SAN) (not shown). Moreover, although not shown, computer systems operated by user 104 can contain computerized components similar to those described above with regard to computer system 100.

Shown in memory 110 (e.g., as computer program products) are an IM client 130 and a privacy system 132 for providing privacy measures in instant messaging systems (e.g., in IM client 130) in accordance with embodiments of the present invention. The privacy system 132 includes a ToV system 134 for controlling how long IM messages will remain on a receiver's and/or sender's display, and a trailing shadow filtering system 136 for selectively displaying at most x number of elements (e.g., characters, words, lines, messages, etc.) of a user's chat history. The privacy system 132 further includes a stealth delivery system 138 for notifying a receiver that an IM message has been received and for displaying the IM message only if approved by the receiver. A private delivery system 140 that institutes additional authentication measures and that can be used in conjunction with other systems of the privacy system 132 is also provided.

The present invention can be offered as a business method on a subscription or fee basis. For example, one or more components of the present invention can be created, maintained, supported, and/or deployed by a service provider that offers the functions described herein for customers. That is, a service provider can be used to provide a service for providing privacy measures in instant messaging systems, as described above.

It should also be understood that the present invention can be realized in hardware, software or a combination thereof. Any kind of computer/server system(s)—or other apparatus adapted for carrying out the methods described herein—is suitable. A typical combination of hardware and software can include a general purpose computer system with a computer program that, when loaded and executed, carries out the respective methods described herein. Alternatively, a specific use computer, containing specialized hardware for carrying out one or more of the functional tasks of the invention, can be utilized. The present invention can also be embedded in a computer program product, which comprises all the respective features enabling the implementation of the methods described herein, and which—when loaded in a computer system—is able to carry out these methods.

The invention can take the form of an entirely hardware embodiment, an entirely software embodiment, or an embodiment containing both hardware and software elements. In a preferred embodiment, the invention is implemented in software, which includes but is not limited to firmware, resident software, microcode, etc.

The present invention can take the form of a computer program product accessible from a computer-usable or computer-readable medium providing program code for use by or in connection with a computer or any instruction execution system. For the purposes of this description, a computer usable or computer-readable medium can be any apparatus that can contain, store, or transport the program for use by or in connection with the instruction execution system, apparatus, or device.

The medium can be an electronic, magnetic, optical, or semiconductor system (or apparatus or device). Examples of a computer-readable medium include a semiconductor or solid state memory, magnetic tape, removable computer diskette, random access memory (RAM), read-only memory (ROM), rigid magnetic disk and optical disk. Current examples of optical disks include a compact disk—read only disk (CD-ROM), a compact disk—read/write disk (CDR/W), and a digital versatile disk (DVD).

Computer program, software program, program, or software, in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

The foregoing description of the preferred embodiments of this invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of this invention as defined by the accompanying claims.

What is claimed is:

1. A method for providing message privacy, comprising: setting a threshold value corresponding to a number of elements in an instant messaging (IM) message conversation pane; receiving or sending a current IM message; displaying the current IM message in the conversation pane; in response to the displaying of the current IM message in the conversation pane, displaying in the conversation pane only a predetermined number of elements received prior to the current IM message, based on the threshold value, wherein the elements are selected from the group consisting of characters, words, lines, and IM messages; and in response to the displaying of the current IM message in the conversation pane, causing a predetermined number of the elements displayed in the conversation pane to partially appear by displaying the predetermined number of the elements using a progressive shadowing, wherein the progressive shadowing causes the predetermined number of the elements to appear visibly lighter than the current IM message in the conversation pane, thereby providing message privacy by limiting visibility of sensitive data to an undesired viewer.

2. The method of claim 1, wherein the progressive shadowing causes the predetermined number of elements to progressively fade to a background color of the conversation pane.

3. The method of claim 1, wherein the threshold value is selected by an IM user.

4. The method of claim 1, wherein the conversation pane displays at least two groups of elements including:
   a first group at a first shade; and
   a second group at a second shade lighter than the first shade.

5. The method of claim 4, wherein the conversation pane further displays a third group of elements at a third shade lighter than the second shade.

6. A system for providing message privacy, comprising: at least one computing device including: a system for setting a threshold value corresponding to a number of elements in an instant messaging (IM) message conversation pane; a system for receiving or sending a current instant messaging (IM) IM message; a system for displaying the current IM message in the conversation pane; a system for displaying in the conversation pane only a predetermined number of elements in response to the displaying of the current IM message in the conversation pane received prior to the current IM message, the displaying of the predetermined number of elements being based on the threshold value, wherein the elements are selected from the group consisting of characters, words, lines, and IM messages; an a system for causing a predetermined number of the elements displayed in the conversation pane to partially appear by displaying the predetermined number of the elements using a progressive shadowing in response to the displaying of the current IM message in the conversation pane, wherein the progressive shadowing causes the predetermined number of the elements to appear visibly lighter than the current IM message, thereby providing message privacy by limiting visibility of sensitive data to an undesired viewer.

7. The system of claim 6, wherein the progressive shadowing causes the predetermined number of elements to progressively fade to a background color of the conversation pane.

8. The system of claim 6, wherein the threshold value is selected by an IM user.

9. The system of claim 6, wherein the conversation pane displays at least two groups of elements including:
   a first group at a first shade; and
   a second group at a second shade lighter than the first shade.

10. The system of claim 9, wherein the conversation pane further displays a third group of elements at a third shade lighter than the second shade.

11. A program product stored on a computer readable medium for providing message privacy when executed by a computing device, the computer readable medium comprising program code for: setting a threshold value corresponding to a number of elements in an instant messaging (IM) message conversation pane; receiving or sending a current IM message; displaying the current IM message in the conversation pane, in response to the displaying of the current IM message in the conversation pane, displaying in the conversation pane only a predetermined number of elements received prior to the current IM message, based on the threshold value, wherein the elements are selected from the group consisting of characters, words, lines, and IM messages; and in response to the displaying of the current IM message in the conversation pane, causing a predetermined number of the elements displayed in the conversation pane to partially appear by displaying the predetermined number of the elements using a progressive shadowing, wherein the progressive shadowing causes the predetermined number of the elements to appear visibly lighter than the current IM message in the conversation pane, thereby providing message privacy by limiting visibility of sensitive data to an undesired viewer.

12. The program product of claim 11, wherein the progressive shadowing causes the predetermined number of elements to progressively fade to a background color of the conversation pane.

13. The program product of claim 11, wherein the threshold value is selected by an IM user.

14. The program product of claim 11, wherein the conversation pane displays at least two groups of elements including:
   a first group at a first shade; and
   a second group at a second shade lighter than the first shade.

15. The program product of claim 14, wherein the conversation pane further displays a third group of elements at a third shade lighter than the second shade.

\* \* \* \* \*